United States Patent [19]
McCreadie

[11] Patent Number: 5,282,637
[45] Date of Patent: Feb. 1, 1994

[54] MOUNT FOR VEHICLE FRONT SUPPORT STRUCTURE

[75] Inventor: David A. McCreadie, Northville, Mich.

[73] Assignee: Ford Motor Company, Dearborn, Mich.

[21] Appl. No.: 806,190

[22] Filed: Dec. 13, 1991

[51] Int. Cl.⁵ .............................................. B62D 25/08
[52] U.S. Cl. .................................... 296/203; 296/194; 296/205; 296/29; 280/779; 403/334; 248/224.2; 248/231.3; 248/316.2
[58] Field of Search ............... 296/188, 192, 194, 203, 296/205, 29; 280/779, 785; 403/334; 248/224.2, 297.2, 231.3, 316.2

[56] References Cited

U.S. PATENT DOCUMENTS

| | | |
|---|---|---|
| 2,732,159 | 1/1956 | Connors ...................... 248/224.2 X |
| 2,750,142 | 6/1956 | McKee ........................ 248/224.2 X |
| 2,798,737 | 7/1957 | Sundlof ......................... 296/189 X |
| 3,835,623 | 9/1974 | Kline .......................... 248/224.2 X |
| 4,241,530 | 12/1980 | Hartvig ....................... 248/224.2 X |
| 4,432,565 | 2/1984 | Suzuki et al. ..................... 280/779 |
| 4,671,536 | 6/1987 | Yoshimura ......................... 280/779 |
| 4,826,234 | 5/1989 | Komatsu ............................ 296/70 |

Primary Examiner—Dennis H. Pedder
Attorney, Agent, or Firm—Daniel M. Stock; Clifford L. Sadler

[57] ABSTRACT

An improved mounting arrangement for an automotive vehicle cross car beam provides a connector arranged on each end of the beam configured to wedgingly engage reciever slides formed in the front pillars of the vehicle.

2 Claims, 2 Drawing Sheets

MOUNT FOR VEHICLE FRONT SUPPORT STRUCTURE

FIELD OF THE INVENTION

The present invention relates generally to automotive vehicle body structures and more particularly to the mounting of cross car beams and mounting structure for such beams.

BACKGROUND OF THE INVENTION

It is known in the automotive vehicle body structural arts to provide a transversely extending beam between the stamped front pillars of an automotive body to enhance the torsional stiffness of the body and to provide a simply supported structure on which vehicle components, such as steering columns and instrument panels, may themselves be mounted.

DESCRIPTION OF THE PRIOR ART

In previously known vehicle constructions, cross car beams have been secured to the front pillars of the vehicle through mounting brackets employing a plurality of fasteners.

U.S. Pat. No. 4,432,565 to Suzuki et al and U.S. Pat. No. 4,671,536 to Yoshimura are exemplary of such approaches. These designs are inconvenient and expensive to assemble because of their use of multiple fasteners. They also provide a mounting that is not ideal with respect to vehicle noise, vibration and harshness. A more recent solution to the problem is exemplified in U.S. Pat. No. 4,826,234 to Komatsu which employs a specially shaped bracket and pillar formation to surround the ends of a tubular cross car support beam. While tending to reduce the number of fasteners necessary to fix the ends of the beam to the vehicle structure, the design suffers from certain disadvantages, including the necessity to have close conformation of the outer surface of the beam with the inner surface of the bracket to ensure secure rattle-free engagement, as well as the additional complexity in the pillar stampings necessitated by the design.

SUMMARY OF THE INVENTION

Responsive to the deficiencies in the prior art, the present invention provides a front support structure for a vehicle that mounts a transversely extending beam between front pillars of the vehicle through agency of simple connector assemblies at each end of the beam that effect wedging engagement between the beam connectors and the front pillars. It is additionally advantageous that this connection scheme results in increased torsional stiffness of the cross car beam.

According to a preferred embodiment of the present invention, a pair of converging slides is formed in each front vertical pillar to engage with slide surfaces formed on end plates of the cross car beam. The wedging engagement is effected through movement in a plane positioned below the horizontal plane of the vehicle for ease of assembly during construction of the vehicle. Positioned in the same plane of insertion is a single fastener at each connector assembly operative to urge the end plate connectors into wedging engagement with the slides and to fixedly secure the beam to the pillars.

BRIEF DESCRIPTION OF THE DRAWINGS

Other features and advantages of the front support structure of the present invention will be apparent to those skilled in the automotive body structural arts upon reading the following description with reference to the accompanying drawings in which.

DESCRIPTION OF A PREFERRED EMBODIMENT

Figure 1:
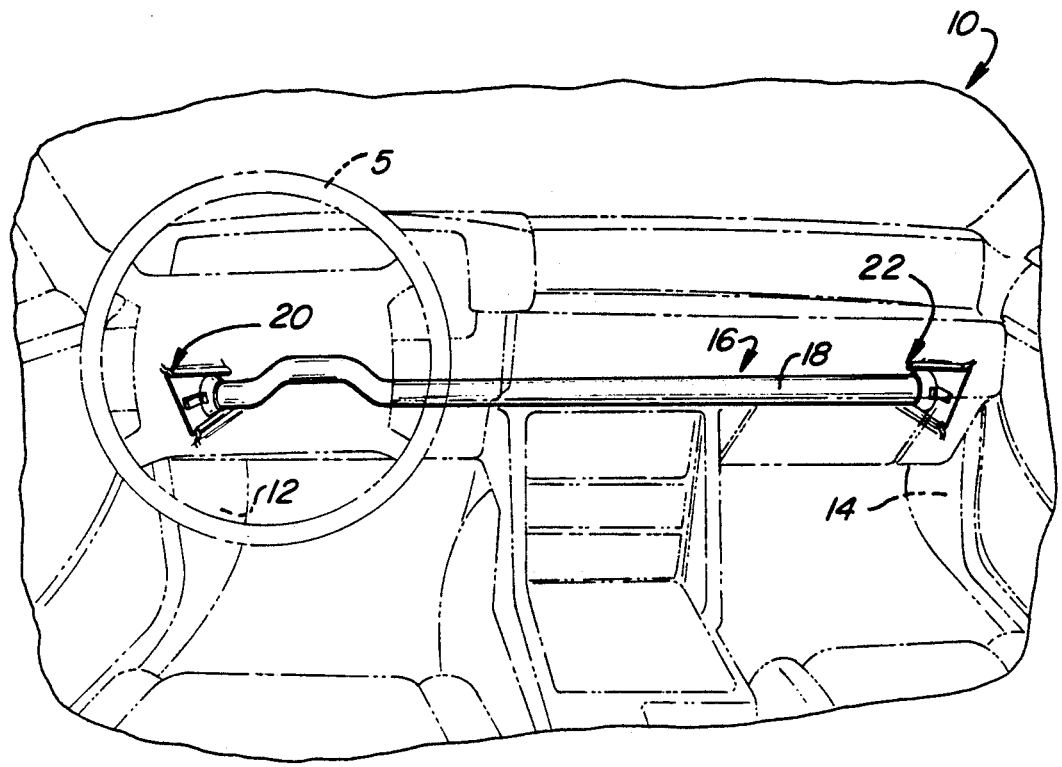
FIG. 1 is a forward looking interior view of an automotive vehicle showing the front support structure installed.

Turning now to the drawings and in particular to FIG. 1 thereof, an automotive vehicle 10 is illustrated as including a pair of vertically extending front pillars, a left pillar 12 and a right pillar 14, and a front support assembly indicated generally at 16 extending between the pillars 12 and 14. The front support assembly 16 is illustrated as including an elongated tubular beam 18 and a pair of symmetrically identical connectors 20, 22.

Figure 2:
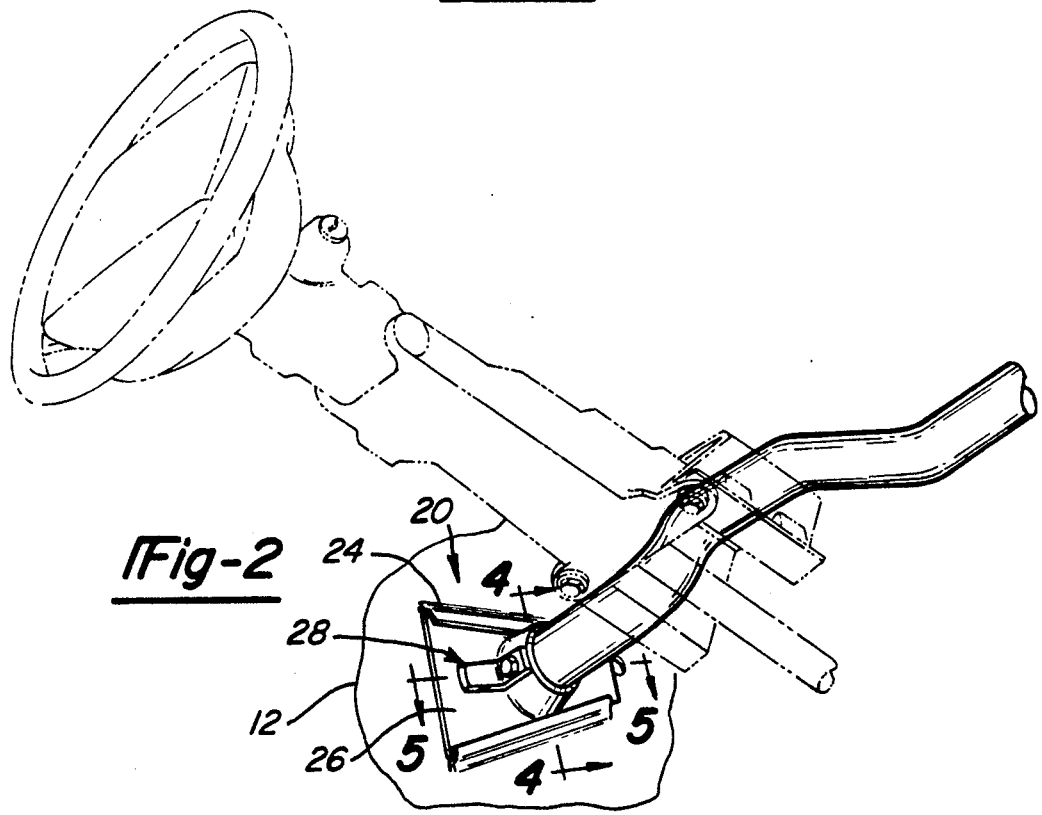
FIG. 2 is a partial lower perspective view of one end of the support structure of the present invention illustrating its mounting componentry.
Figure 3:
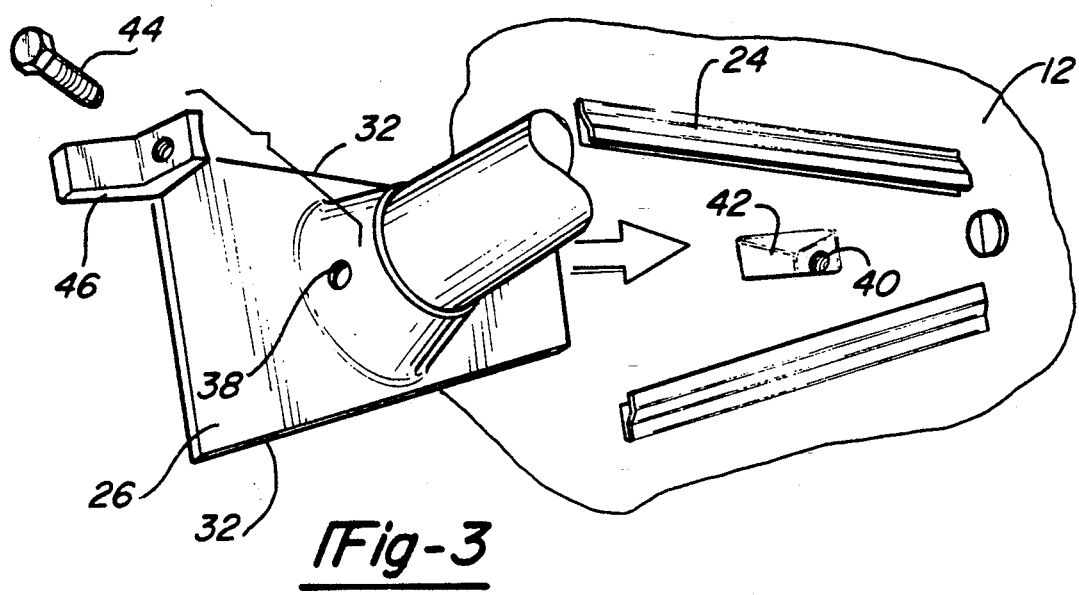
FIG. 3 is an exploded perspective view of the connector assembly shown in FIG. 2.
Figure 4:
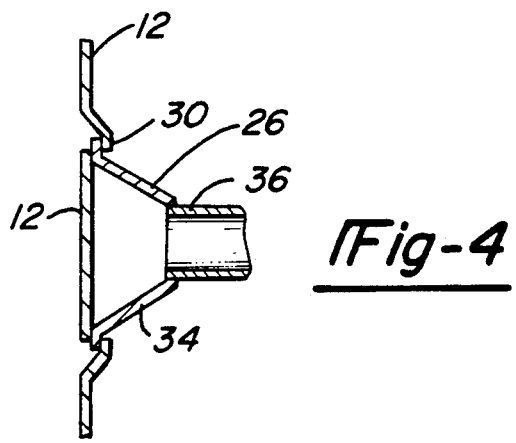
FIG. 4 is a cross-sectional view taken along lines 4—4 of FIG. 2.

Turning next to FIG. 2, the connector 20 is illustrated as including a pair of converging slides 24 formed in the pillar 12 as by stamping, an end plate 26, and a fastener assembly 28. The slides 24 preferably form an angle of about 30° in convergence and are arranged symmetrically about a plane about 35° below the horizontal plane of the vehicle body. The slides 24 are struck out of the stamping of the pillar 12 and include a retaining lip 30 for laterally guiding the end plate 26, as may best be seen in FIG. 4.

The end plate 26 is illustrated as comprising a generally hat-shaped plate having slide surfaces 32 formed on it substantially parallel with the slides 24 for effecting wedging engagement between the plate 26 and the slides 24. Control of parallelism tolerances to enhance the wedging engagement is also contemplated for this embodiment. The plate 26 further includes an upstanding receiver section 34 for accepting the end 36 of the beam 18, as may best be seen in FIG. 4. The beam end 36 may be welded to the receiver section 34 or otherwise suitably secured to it. A fastener clearance hole 38 pierces the receiver section 34 in a central location between the converging slide surfaces 32 for alignment with a nut 40 carried in a pocket 42 formed in the pillar stamping 12.

Figure 5:
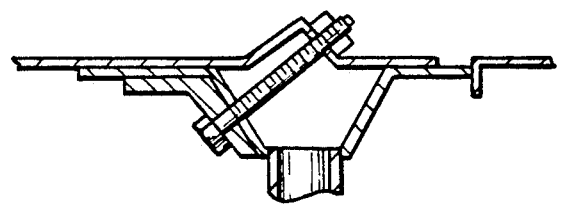
FIG. 5 is a cross-sectional view taken along lines 5—5 of FIG. 2.

The nut 40 forms a portion of the fastener assembly 28 and defines a fastening axis extending in an angle about 30° from the vertical plane of the pillar stamping 12. A bolt 44 and load bearing washer 46 complete the fastener assembly 28. As may best be seen in FIG. 5, the bolt 44 threadedly engages the nut 40 to complete the assembly of the connector 20. The angular relationship of the fastener axis is chosen to urge the end plates 26 into full-contact wedging engagement of the slide surfaces 32 with the slides 24.

In assembling the beam 18 into a vehicle, an efficient and simple assembly operation is possible through fixing the end plates 26 to the beam 18 and sliding the plates 26 into engagement with slides 24. Final securement through agency of the fastener assembly 28 is then facilitated by the described arrangement even when a steering column has been previously assembled, as shown.

While only one embodiment of the front support of the present invention has been described, those skilled in the automotive structural arts will appreciate that others may be possible without departing from the scope of the following claims.

I claim:

1. A front support structure for a vehicle body, the body having left and right front vertically extending pillars, the front support structure comprising;

an elongated beam extending transversely between the pillars;

portions of each pillar extending outwardly therefrom to define a pair of converging slides; and a pair of end plates, one fixedly secured on each end of said elongated beam, the end plates each having slide surfaces formed thereon to extend substantially parallel with said pillar converging slides and received in wedging engagement therein.

2. A front support structure as defined in claim 1, and further comprising a single fastener assembly operative to urge each of said end plates into wedging engagement with said pillar converging slides.

* * * * *